United States Patent [19]

Walker

[11] Patent Number: 4,896,749

[45] Date of Patent: Jan. 30, 1990

[54] EMERGENCY VEHICLE BRAKING SYSTEM AND METHOD FOR USING SAME

[76] Inventor: Frank H. Walker, 7271 Green Valley Dr., Grand Blanc, Mich. 48439

[21] Appl. No.: 148,675

[22] Filed: Jan. 26, 1988

[51] Int. Cl.$^4$ .......................... B60T 1/14; B60B 15/00
[52] U.S. Cl. ........................................ 188/5; 188/2 R; 188/4 R; 180/164
[58] Field of Search .................... 188/2 R, 4 R, 5; 303/22.1; 180/164

[56] References Cited

U.S. PATENT DOCUMENTS

| | | | |
|---|---|---|---|
| 2,687,191 | 8/1954 | Shannon | 188/5 X |
| 2,710,074 | 6/1955 | Simpson | 188/5 |
| 2,841,249 | 7/1958 | Allen | 188/2 R |
| 3,116,897 | 1/1964 | Theed | 180/164 X |
| 3,167,154 | 1/1965 | Salvetti | 188/5 |
| 3,232,633 | 2/1966 | Feher | 188/5 X |
| 3,799,293 | 3/1974 | Howells et al. | 188/5 |
| 3,894,609 | 7/1975 | Wulf | 188/5 X |
| 4,317,507 | 3/1982 | McMillan | 188/5 |
| 4,325,465 | 4/1982 | Lemon | 188/4 R |

FOREIGN PATENT DOCUMENTS

| | | | |
|---|---|---|---|
| 0409078 | 1/1925 | Fed. Rep. of Germany | 188/5 |
| 2306044 | 9/1974 | Fed. Rep. of Germany | 180/164 |
| 3025388 | 1/1982 | Fed. Rep. of Germany | 180/164 |
| 1459988 | 11/1966 | France | 188/5 |
| 2353421 | 12/1977 | France | 188/5 |

*Primary Examiner*—Andres Kashnikow
*Assistant Examiner*—Richard Potosniak
*Attorney, Agent, or Firm*—Brooks & Kushman

[57] ABSTRACT

An emergency braking device is attached to the vehicle body and is shiftable between an inoperative position and an operative position upon the occurrence of an emergency braking situation. The braking device is provided with a vacuum shroud which engages the roadway to form a substantially enclosed cavity. The shroud is shifted between the operative and inoperative position by a shifting mechanism. A pump is provided to evacuate air from the enclosed cavity to cause the vacuum shroud to be urged toward the roadway. An attachment device temporarily couples the vacuum shroud to the vehicle wheel causing the normal load of the wheel on the roadway to be increased, enabling the vehicle brake to decelerate the vehicle at an increased rate.

17 Claims, 7 Drawing Sheets

EMERGENCY VEHICLE BRAKING SYSTEM AND METHOD FOR USING SAME

FIELD OF INVENTION

This invention relates to vehicle brakes, and more particularly to an emergency vehicle braking apparatus and method.

BACKGROUND OF INVENTION

Traditionally, vehicles such as automobiles or the like decelerate by applying brakes limiting the rotation of the vehicle's wheels. The factor limiting the rate of vehicle deceleration is the available tire to road friction, which is a product of tire normal force and friction coefficient. Developments in tires, road services and brakes have sought to optimize the tire-road friction coefficient by utilizing high friction materials, overcoming obstacles such as fluid hydroplaning through tread design, utilizing the advantage of rolling friction over sliding friction by preventing skidding with antilock brakes, utilizing load sensitive and deceleration sensitive proportioning systems to optimize front-to-rear distribution, however, with all these sophisticated advances, deceleration is limited to approximately 1G. There have been sporadic efforts over the years to prove vehicle braking capability by means of increasing the normal loading on the tire as opposed to trying to maximize coefficient friction. Normal loading of the tire is conventionally dependent solely upon the weight of the vehicle. During a deceleration maneuver, there may be a weight transfer to the front wheels, however the total weight remains constant.

One of the most common methods of increasing the normal load of a vehicle's tires upon the roadway surface is through the use of airfoils and spoilers, as typically seen in racing vehicles. Airfoils work effectively, particularly movable airfoils, at high speeds, but are impractical and ineffective for automobiles operating at typical highway speeds. In order to increase normal vehicle load, several suggestions have been made to employ vacuum-type devices: U.S. Pat. No. 3,167,154—Salvetti suggests the use of a large vacuum chamber attached to the vehicle chassis and shiftable to a road engaging position. U.S. Pat. No. 4,044,862—Savarimuthu suggests the use of suction cups affixed to the vehicle chassis to engage the roadway. U.S. Pat. No. 3,799,293—Howells et al. suggests the use of an auxiliary road engaging friction pad held securely to the roadway by a Rockfield powered jet pump. Others have suggested the use of a vacuum powered anchor or an explosively driven pin which is affixed to the roadway and connected to a vehicle by a cable to increase deceleration rates in emergency situations, as shown in U.S. Pat. Nos. 3,292,738—Bernert et al. and 4,317,507—McMillian.

OBJECTS, FEATURES AND ADVANTAGES OF INVENTION

An object of the present invention is to increase the rate of deceleration of a vehicle using a vehicle's conventional brakes by increasing the vehicle normal load.

Another object of the present invention is to achieve vehicle deceleration rates in an emergency stop in excess of 1G.

A feature of the present invention is the capability to effectively utilize the load bearing capacity of a vehicle's rear wheels in an emergency stop.

Another feature of the present invention is that the emergency braking apparatus can be carried by the vehicle chassis when not in an operation, thereby maintaining low vehicle unsprung mass.

An advantage of the present invention is the ability to utilize a vehicle's conventional brakes in an emergency stop at a rate in excess of 1G, while providing the vehicle operator with the ability to control vehicle deceleration rates.

Other objects, features and advantages of the present invention will become more fully apparent from the following description of the invention, claims and the accompanying drawings.

SUMMARY OF INVENTION

The emergency braking device of the present invention is intended to be utilized on a vehicle which is driven on the roadway and is provided with a chassis which is suspended on at least one front and rear wheel, each of which is provided with a brake. The emergency braking device is provided with a vacuum shroud which is attached to the vehicle adjacent the rear wheel. The vacuum shroud is provided with a generally planar opening. The shift device moves the vacuum shroud between an inoperative position which is clear of the roadway, to an operative position in which the vacuum shroud opening is positioned adjacent the roadway surface to define a substantially enclosed cavity. A pump is provided to evacuate the air from within the cavity to cause a pressure differential urging the vacuum shroud towards the roadway. An attachment device connects the vacuum shroud in the operative position to the vehicle rear wheel causing normal force of the rear wheel to be increased, enabling the vehicle brakes to decelerate the vehicle at an increased rate.

BRIEF DESCRIPTION OF PREFERRED EMBODIMENT

Figure 1:
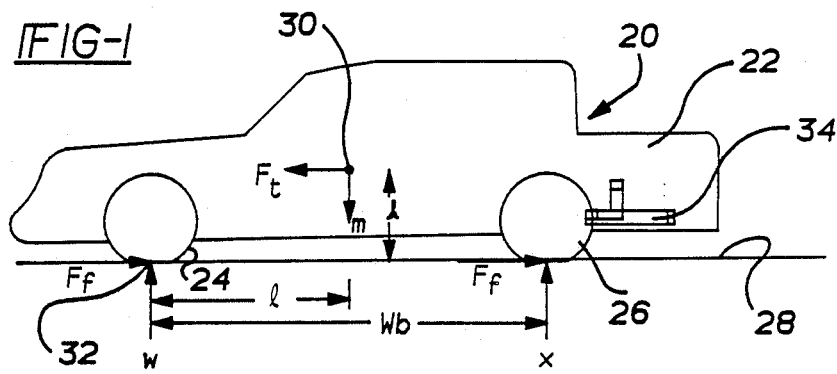
FIG. 1 is a side elevation of an outline of a vehicle employing the present invention in the inoperative position.

With reference to the drawings, a first preferred embodiment of the invention is illustrated by way of example in FIGS. 1–14. In FIG. 1 a vehicle 20 is shown in outline having a body 22, a pair of front wheels 24, and a pair of rear wheels 26. The vehicle is resting on a roadway 28. The two front wheels 24 exert a normal force W upon the roadway, and the rear wheels 26 exert a normal force X upon the roadway. When the vehicle is at rest or moving at a constant velocity on a flat smooth surface, normal loads W and X will be merely a function of the weight of the vehicle and the location of the center of gravity 30. The weight of the vehicle designated by vector M originating in the center of gravity 30 will be equal to the sum of normal load vectors X and W at constant deceleration conditions, i.e.:

$$M = W + X$$

One should also note that the distribution of the load between the front and rear wheels is a function of the location of the center of gravity and acceleration or deceleration rates. When the vehicle is at rest or traveling at a constant velocity, the respective wheel load can be redetermined by summing the moments about the point 32, the center of the wheel 24, roadway 28 contact path:

$$\Sigma M \big)_{32} = 0 = ML - XW_b$$

Where $W_b$ the vehicle wheelbase and $l$ is the longitudinal distance between the center of gravity and the front tire contact point 32.

During a braking maneuver, friction loads $F_f$ and $F_r$ are exerted on the front and rear wheels respectively. At constant rates of deceleration, the sum of the longitudinal forces will equal 0, $\Sigma F = 0 = F_f + F_r - F_t$. Similarly, the sum of the moments involved, point 32, will equal 0:

$$\Sigma M \big)_{32} = 0 = LM - HF_t - XW_b$$

Since the coefficient of friction will not exceed 1.0, $F_f$ and $F_r$ will be less than or equal to W and X respectively, therefore, $F_t$ will be less than or equal to M; the weight of the vehicle. The maximum rate of deceleration theoretically is achievable assuming coefficient of friction of one is obtainable, is therefore, 1G.

Figure 2:
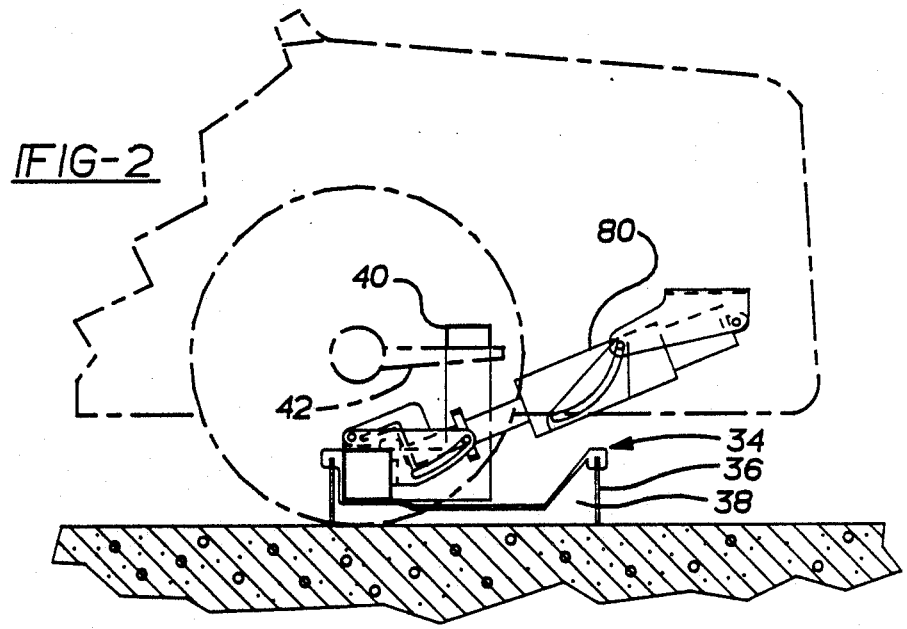
FIG. 2 is an enlarged side elevation of a vehicle showing the present invention in the operative position.

In order to decelerate at rates higher than 1G, wheel normal forces W and X must be increased. To achieve the increased normal forces, vehicle 20 is provided with an emergency braking device 34 which is shown mounted directly behind the rear wheel in FIG. 1 in the inoperative position. During a panic stop, emergency braking device 34 is shifted downward to engage the roadway, as shown in FIG. 2. The emergency braking device includes a shroud 36 which is provided with an opening which cooperates with the roadway to define a substantially enclosed cavity 38. The cavity is evacuated by a vacuum pump (not shown in FIG. 2) to cause the shroud to be urged toward the roadway as a result of the pressure differential between the cavity volume and atmospheric pressure. The shroud is provided with a support rail 40 which engages brackets 42 attached to the rear wheel hub. As the shroud is urged toward the roadway, a load is transmitted through support rail 40 and bracket 42 to increase the normal force of the rear wheels upon the roadway.

Figure 3:
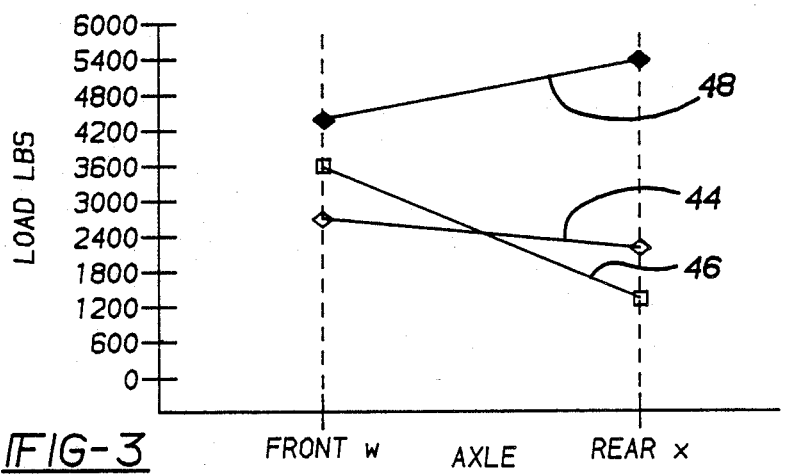
FIG. 3 is a plot showing the invention's effect on vehicle normal load front-to-rear distribution.

With reference to FIG. 3, the effect of the use of a shroud is dramatically shown. Curve 44 illustrates the load distribution between the front and rear wheels in the static and constant velocity condition. During a 0.8G deceleration maneuver, shown in curve 46, the load transferred to the front wheels as a result of deceleration, is apparent. When emergency braking device 34 is employed, a 1.6G decel can be achieved, resulting in the front and rear wheel normal loads, depicted by curve 48. Rear wheel normal loads increase dramatically as a result of the use of the emergency braking device, however, it is important to note that front wheel normal loads increase as well due to the increased weight transfer resulting from the higher deceleration rates. For passenger cars, the normal loads achieved utilizing the braking device are within the obtainable loads which can be born by commercially available tires and absorbed by conventional style wheel brakes in a single stop.

Figure 4:
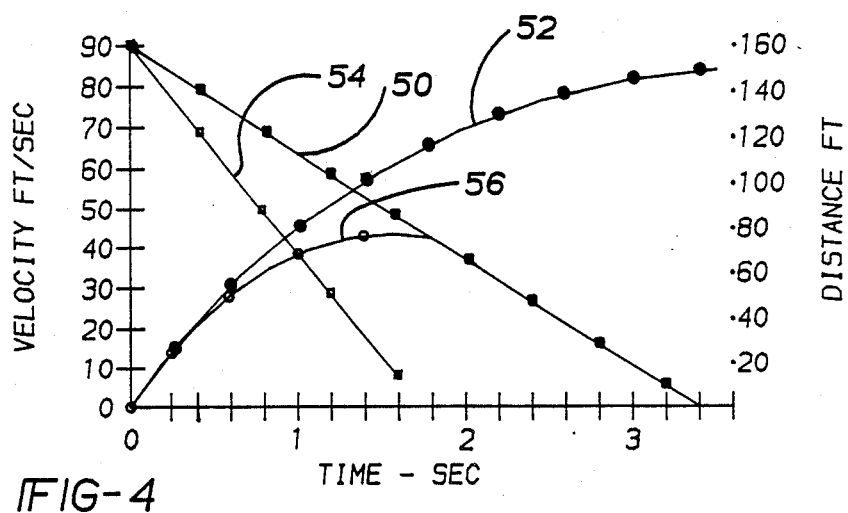
FIG. 4 is a plot showing vehicle velocity versus time and distance versus time in a stopping maneuver.
Figure 5:
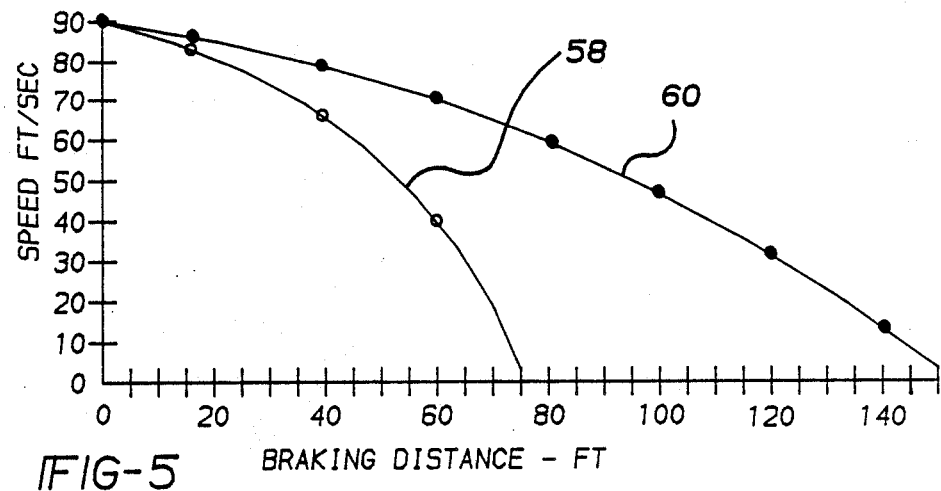
FIG. 5 is a plot showing vehicle speed versus distance in a stopping maneuver.
Figure 6:
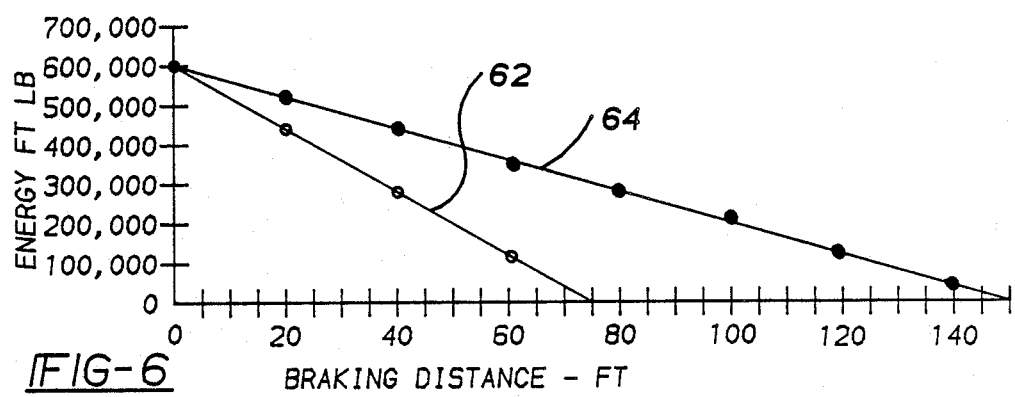
FIG. 6 is a plot showing vehicle kinetic energy versus distance in a braking maneuver.

The dramatic improvement in vehicle stopping ability is further illustrated by FIGS. 4–6. In FIG. 4, curve 50 illustrates the velocity of vehicle, with respect to time. Curve 52 illustrates the distance traveled with respect to time for a 0.8G decel maneuver. Curves 54 and 56 illustrate velocity and distance with respect to time for a similar vehicle decelerating from 60 mph at the rate of 1.6G. As clearly illustrated, changing the deceleration rate from 0.8 to 1.6G makes a dramatic effect in the time required to stop a vehicle and velocity of the vehicle at a given time from the initiation of the braking. FIGS. 5 and 6 further highlight the dramatic performance improvement which can be achieved by increasing deceleration rates using an emergency braking device of the type described. FIGS. 58 and 60 illustrate the relationship between vehicle speed and distance traveled after the initiation of braking from a 60 mph starting velocity. More important than the speed is the vehicle energy, in terms of damage incurred at the time of an accident. Curves 62 and 64 illustrate the difference between 0.8 and 1.6G decelerations on the vehicle energy versus braking distance graph.

Figure 7:
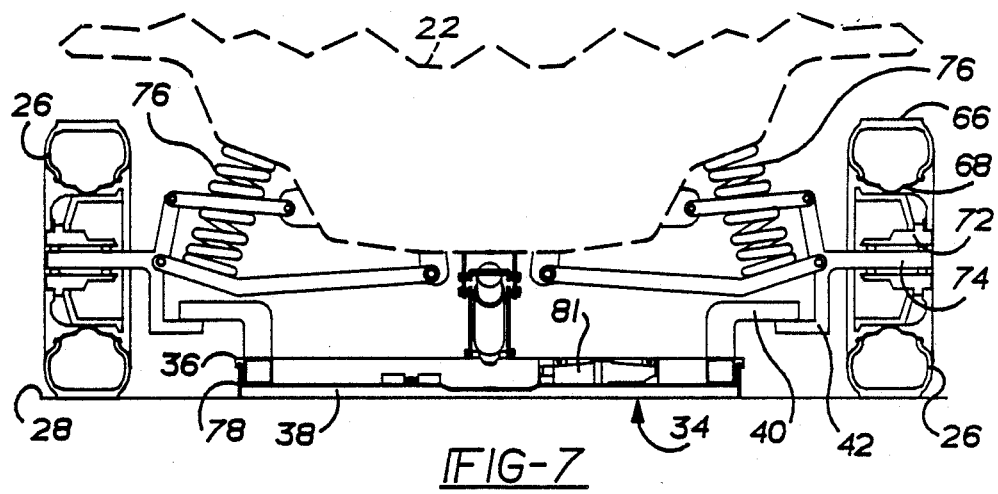
FIG. 7 is a partial cutaway rear view of a vehicle generally through the rear wheel assembly.
Figure 8:
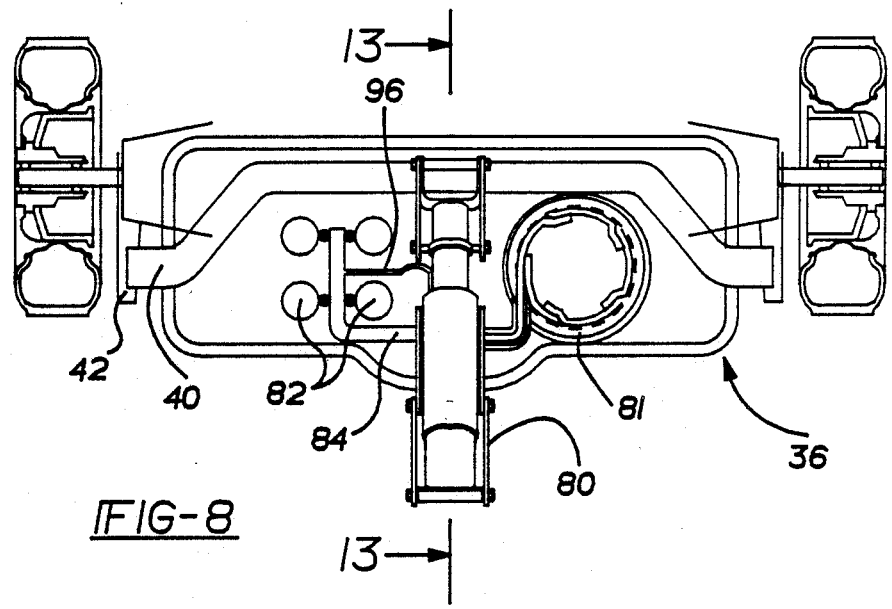
FIG. 8 is a plan view of FIG. 7.
Figure 9:
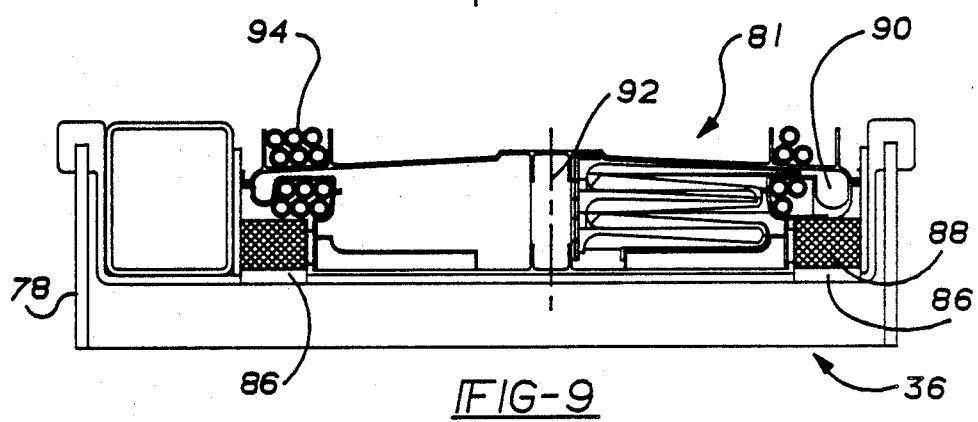
FIG. 9 is an enlarged cutaway view taken along lines 9—9 of FIG. 8.

A more detailed diagram of the emergency braking apparatus is shown in FIGS. 7 and 8. FIG. 7 is a front sectional view taken through the rear wheels of the vehicle showing the emergency braking device 34 in the deployed state. A portion of the vehicle body 22 is shown in outline for reference. Rear wheel assemblies 26 and 26' are shown in cross-sectional view to illustrate tire and wheel 66 and 68, hub 72 and spindle 74. The entire wheel and brake assembly and associated support structure form the rear unsprung mass. Body 22 is suspended thereon by springs 76 and 76'. Bracket 42 is affixed to spindle 74 enabling the energy braking device support racket 40 to directly load the rear wheels.

In order to maintain a vacuum within the enclosed cavity 38, which is bound by shroud 36 and the roadway 28, the shroud is preferably provided with a flexible seal 78 which extends about the shroud opening periphery. A preferred material for the shroud seal is a rubberized brush modified from a commercial product made by Fuller Brush Co. The rubberized brush has good wear and tear characteristics, is flexible enough to maintain a seal on the irregular surface, and is economical. Seal 78 needs to be flexible enough to enable a vacuum tight seal between the shroud and the roadway to be achieved through a limited range of shroud roadway spacings. Since the vehicle tires are elastically deformable radially, when the emergency braking device is initially deployed there will be a little load, and therefore, little radial compression on the rear tires resulting from vehicle weight transfer during the stopping maneuver. Seal 78 needs to be long enough to enable a good seal between the roadway to be achieved when tire effective radius is at its maximum level. Once the shroud engages the roadway and a vacuum is established, the load exerted on the rear wheels by the shroud will cause the rear tires to radially compress, moving the shroud closer to the roadway. Seal 78 needs to be flexible enough to enable the seal to be compressed a limited amount as the tires radially deflect.

As shown in FIG. 7, cylinder 80 extends between the emergency braking device and the vehicle body 22. A cylinder 80 shifts the emergency braking device between an inoperative position, shown in FIG. 1 where the device is stored clear of the roadway, to an operative position shown in FIGS. 7 and 8 with the emergency braking device engaging the road surface 28. After the emergency braking maneuver has been completed, cylinder 80 serves to return the emergency braking device to the inoperative position. As previously described, the emergency braking device 34 is provided with a shroud 36 which cooperates with the roadway 28 to define an enclosed cavity 38. Seal 78 surrounds the periphery of shroud 36. The emergency braking device is provided with a vacuum source which preferably is affixed to the shroud, as shown in the preferred embodiment, to form a simple compact unit.

In the preferred embodiment shown in FIGS. 1–14, the vacuum source is provided by a turbine/pump 81 powered by a source of compressed gas. In the embodiment shown in FIGS. 7 and 8, compressed gas is supplied by four solid fuel sources 82 connected to the turbine/pump 81. Turbine/pump 81 is shown in more detail in an enlarged cross-section of FIG. 9 and has an air inlet 86 which communicates with the interior of enclosed cavity 38. Air inlet 86 is provided with a filter 88 to reduce the entry of debris into the turbine/pump. The turbine/pump is further provided with an outlet scroll/defuser 90. Preferably a multistage pump is used like the three stage pump shown in FIG. 9. The turbine/pump rotors are freely rotatably supported upon rotor support shaft 92. Gas manifold 84 is provided with a plurality of gas input pipes 94 which tangentially introduce compressed gas into the turbine/pump unit in the second and third pump stages. The driving of the turbine/pump as a result of the introduction of compressed gas through gas input pipes 94 causes the turbine to rotate, thereby pumping gas from the turbine inlet 86 to the outlet/defuser 90 which is vented to atmosphere. As an alternative to solid fuel gas sources 82, a pressurized gas cylinder may be utilized.

Figure 10:
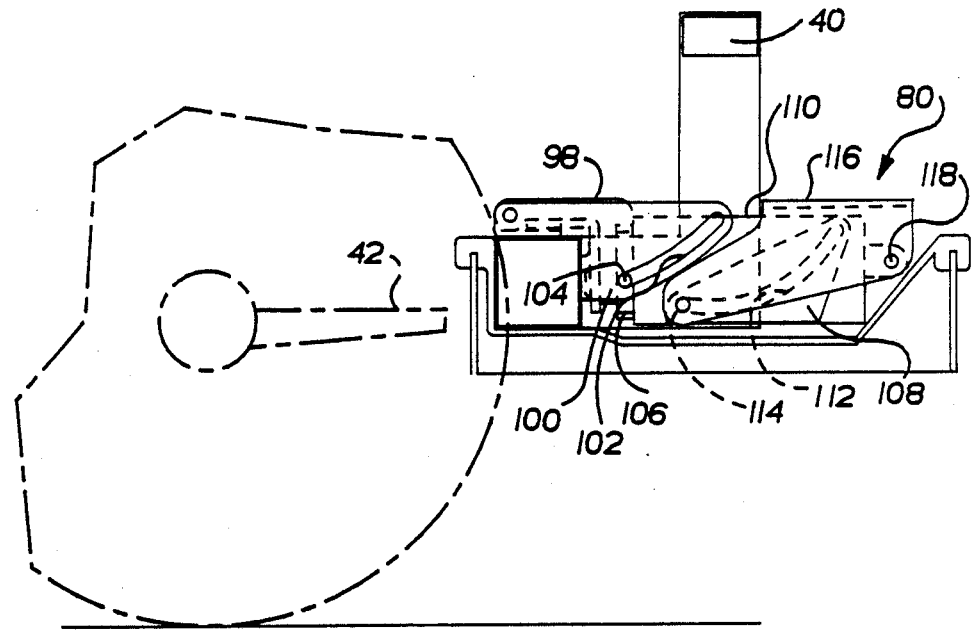
FIGS. 10–13 are a sequence of enlarged cutaway side elevations showing the emergency braking device in the inoperative, operative and in two intermediate positions.
Figure 11:
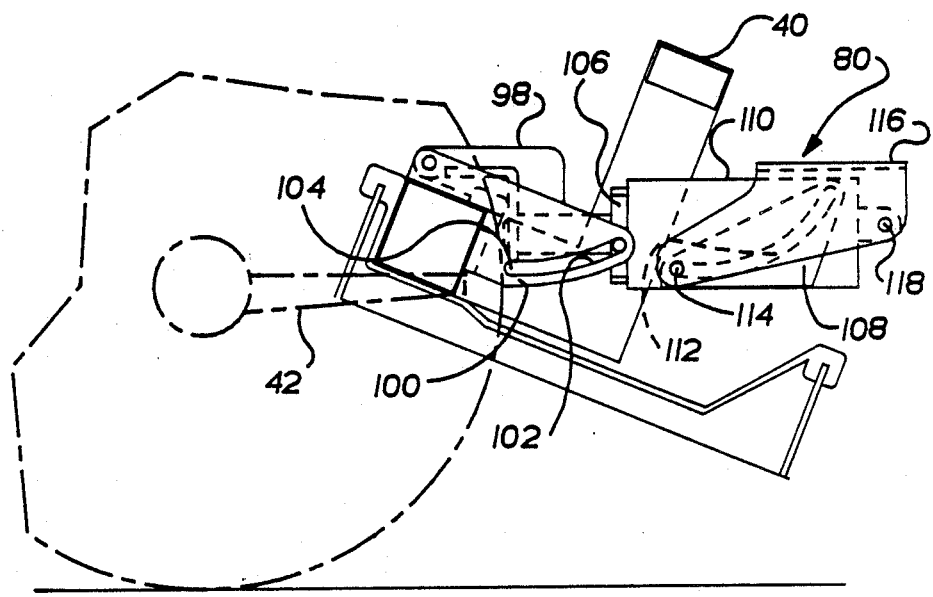
Figure 12:
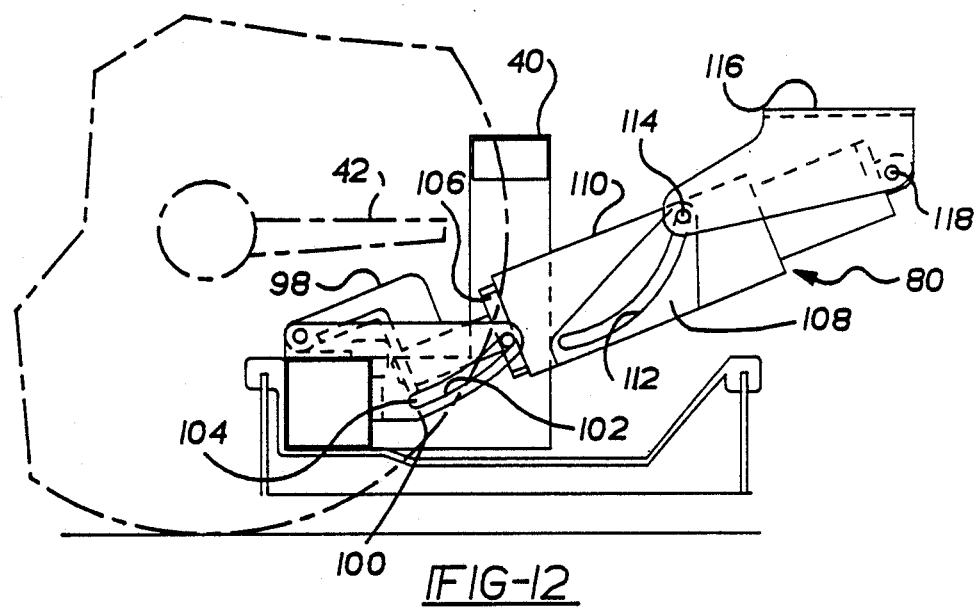
Figure 13:
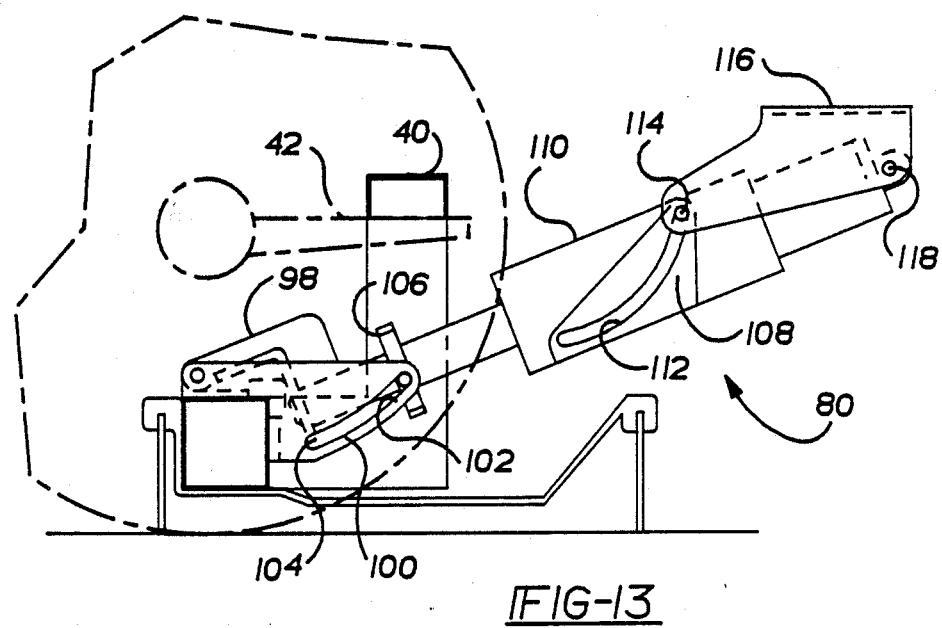

FIGS. 10–13 show the emergency braking device in the inoperative, operative and two intermediate positions. In FIG. 10 the device is in the inoperative position, and cylinder 80 is fully retracted. When the device is energized cylinder 80 is pressurized by the source of pressurized fluid, such as line 96 connecting cylinder 80 to manifold 84, as shown in FIG. 8. Cylinder 80 is preferably a multistage double ended cylinder which is spring loaded to be maintained in a small compact contracted position as shown. When the cylinder is pressurized, the first cylinder stage extends, as shown in FIG. 11. Shroud 36 is pivotably attached to mounting flange 98, as further provided with a guide plate 100 having an arcuate slot 102 cooperating with pin 104 affixed to collar 106. As the first stage of the cylinder extends, shroud 36 shifts forward and rotates slightly clockwise, as shown in FIG. 11. As the cylinder is further pressurized, the second stage extends, as shown in FIG. 12, causing the shroud to further move forward. During the second stage of cylinder extension, guide plate 108 affixed to the cylinder body 110, provided with a slot 112 cooperates with pin 114 on mounting bracket 116 to cause the cylinder and shroud assembly to rotate counterclockwise above cylinder to shroud pivot point 118. As the cylinder is further pressurized, the third stage of the cylinder extends, as shown in FIG. 13, causing the shroud 36 to move forward along the axis of the cylinder until the cylinder is fully extended and support rail 40 engages bracket 42 and the shroud seal 78 engages the road surface 28. When the cylinder is vented back to atmospheric pressure, the internal springs within the cylinder assembly cause the cylinder unit to contract, thereby reversing the cylinder extension process.

The emergency braking device is designed to be used very infrequently in emergency stops only. Ideally, the source of pressurized gas which drives the turbine/pump is sufficient to handle more than one stop. In the case of using a cylinder containing pressurized gas, the cylinder volume can be selected so that a sufficient amount of gas is available for multiple stops, and gas flow can be controlled by a solenoid valve. In the case of a solid fuel gas source, such as a miniature rocket motor or the like, once combustion is initiated it cannot be terminated until the fuel is expended. Therefore, the preferred embodiment of the invention is provided with four solid fuel gas sources, each capable of handling a single high speed emergency stop.

Figure 14:
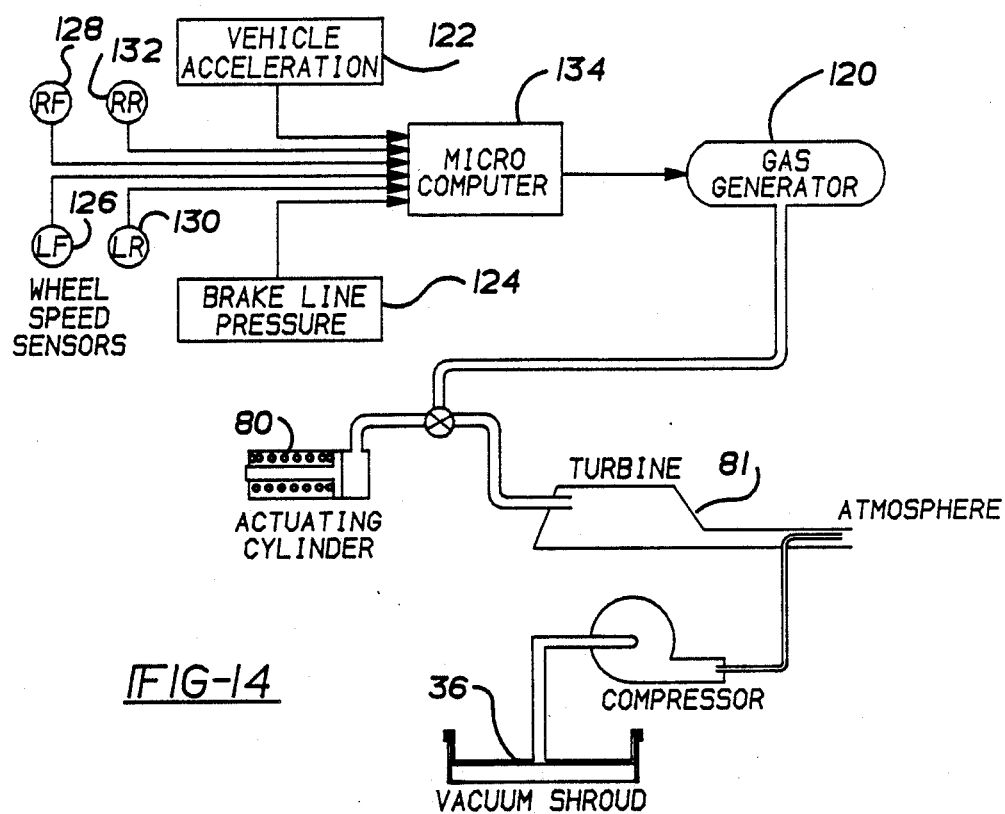
FIG. 14 is a schematic diagram of the emergency braking apparatus.

A schematic diagram of the entire emergency braking system and a representative deployment signal generating circuit is shown. As previously described, the source of gas 120 provides pressurized gas to the actuating cylinder 80 and the turbine/pump unit 81. The turbine/pump is connected to the vacuum shroud to evacuate the enclosed cavity 38 formed between the vacuum shroud and the roadway. The entire emergency braking device is activated by initiating gas flow, either by opening a valve in a compressed gas system, or by igniting the solid fuel in a solid fuel gas source system. Gas flow is initiated by an electrical signal or the like which is received by the solenoid valve or the fuel ignitor. In order to determine when an emergency braking situation exists, preferably a number of factors are considered to prevent an inadvertent deployment. As shown in FIG. 14, a micro-computer which makes the ultimate deployment decision considers inputs from accelerometer 122 which measures the vehicle acceleration/deceleration rates, a brake line pressure sensor 124 and individual wheel speed sensors 126, 128, 130 and 132 coupled to the left front, right front, right rear and left rear wheels of an automobile. The six inputs are evaluated by microcomputer 134 and an appropriate algorithm determines when deployment is appropriate. Preferably, the emergency braking device will be installed on vehicles having microcomputer controlled, anti-lock braking systems, thereby enabling a common microcomputer and wheel sensors to be utilized for both systems.

Figure 15:
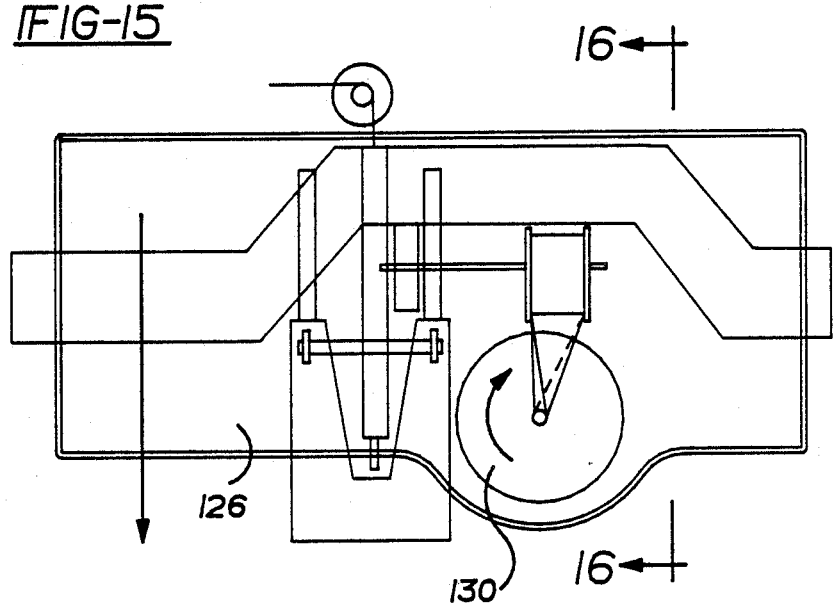
FIG. 15 is a plan view of an alternative embodiment of the invention.
Figure 16:
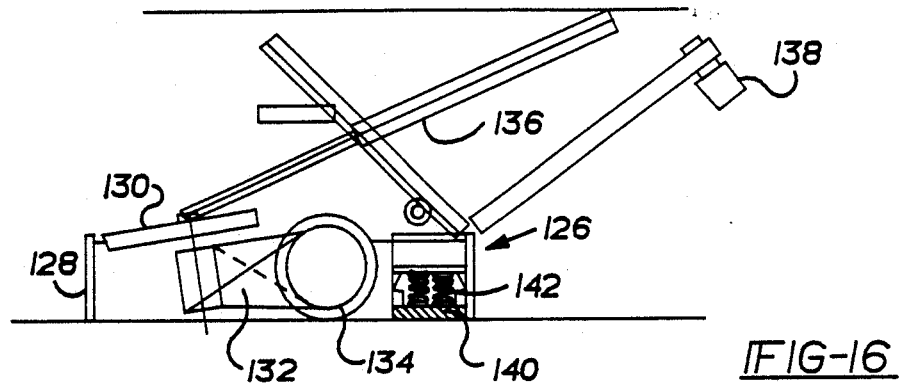
FIG. 16 is a side sectional view taken along lines 16—16 of FIG. 15.

An alternative embodiment of the invention is shown in FIGS. 15 and 16 utilizing the friction wheel driven turbine/pump as opposed to utilizing a gas driven turbine. The emergency braking device, shown in plan view in FIG. 15, is provided with a shroud 126 having a peripheral seal 128. Turbine/pump 130 is driven by belt 132 connected to road driven wheel 134. Rather than utilizing a gas powered pneumatic cylinder as in the first embodiment, this alternative embodiment utilizes a prefilled gas spring 136 to deploy the shroud. A small electrically driven retractor mechanism 138 is used to return the shroud to the inoperative position.

To further enhance vehicle braking, the second embodiment, shown in FIGS. 15 and 16, is provided with a friction block 140 which directly engages the roadway and supplements the friction loading of the vehicle tires. Friction block 140 is mounted on springs 142 to maintain the friction block in constant engagement with the roadway when the shroud is deployed. If the vehicle tires have sufficient load capacity to achieve adequate deceleration rates without being overloaded, the friction block 140 is not necessary.

Figure 17:
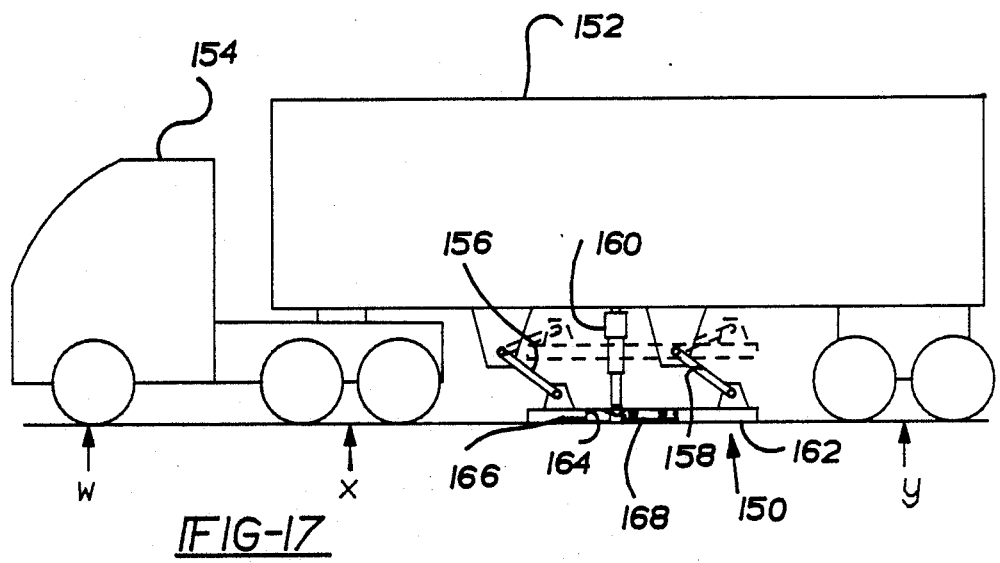
FIG. 17 is an alternative embodiment of the invention installed on a tractor trailer.
Figure 18:
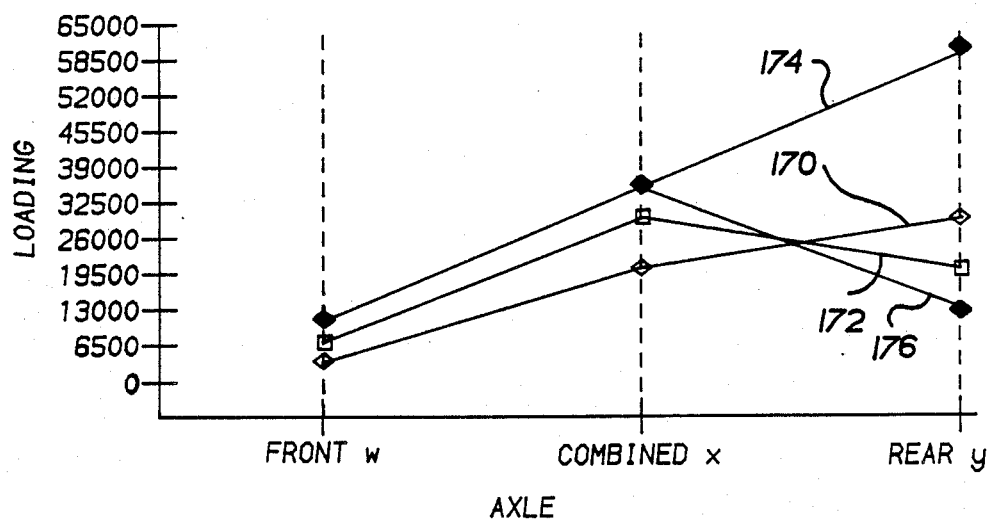
FIG. 18 is a normal load distribution plot for the FIG. 17 embodiment.

Yet another embodiment of the invention is shown in FIGS. 17 and 18. The emergency braking device 150 is affixed to a trailer 152 which is drawn by a tractor 154. Tractor 154 is provided with a pair of front wheels which exert a normal force W upon the roadway, and a set of rear wheels which collectively exert a normal force X upon the roadway. Trailer 152 is pivotally attached to, and supported by, tractor 154, and is provided with a set of rear trailer wheels which collectively exert a normal force Y upon the roadway, as shown in FIG. 17. The emergency braking device 150 is attached to trailer 152 by links 156 and 158 and pneumatic cylinder 160. Pneumatic cylinder 160 moves the emergency braking device between the operative position of FIG. 17 and the inoperative position shown in phantom outline. The emergency braking device 150 is provided with a shroud 162 for cooperating with the roadway, a pump 164 for evacuating the shroud, and means to drive the pump such as solid fuel gas source 166. The emergency braking device is further provided with a friction pad 168 which engages the roadway to assist in the stopping of the tractor-trailer.

Referring to FIG. 18, the dramatic effect of the emergency braking device is clearly shown. Curve 170 depicts the static loading on the tractor-trailer wheels at a constant velocity. During a 1G deceleration maneuver, the normal loads at points W, X and Y are shown in curve 172. If a vacuum shroud, of the type shown in FIGS. 1-14 previously described for an automobile, were affixed to the rear trailer wheels, and a 2G deceleration rate achieved, the rear wheel normal loads would reach excessive levels, as shown by curve 174. Since it may be impractical to load the trailer tires so heavily, the use of an alternative friction pad to engage the roadway is possible. Utilizing the friction pad configuration of FIG. 17, a high deceleration rate can be achieved with minimal increase in maximum tire loading, as shown by curve 176. Note that the orientation of links 156 and 158 may be altered to further adjust the load distribution. The emergency braking device may be mounted in front of or behind the trailer wheels with a leading arm vertical, or a trailing arm linkage configuration to properly influence the load distribution among the axles of the tractor and trailer.

METHOD FOR USING EMERGENCY BRAKING SYSTEM

In addition to the emergency braking apparatus being novel, the method of which both the motor vehicle and trailer devices utilized is likewise novel. As previously described, the method of stopping the vehicle involves the steps of providing an emergency braking device to be attached to the vehicle adjacent the rear wheels. The emergency braking device is provided with a vacuum shroud having a substantially planar opening formed therein. The next step involves the sensing of the occurrence of an emergency braking situation to generate a deployment signal. Finally, after the occurrence of the deployment signal there is the shifting of the vacuum shroud between an inoperative to an operative position in which the shroud cooperates with the roadway to define a substantially enclosed cavity. The final step to the broad method is the evacuation of the vacuum shroud and the vehicle rear wheel to be urged toward the roadway, increasing the normal load and enabling the brake to decelerate the vehicle at an increased rate. Preferably, the method also includes the step of returning the vacuum shroud to the inoperative position upon the completion of the emergency braking situation.

The method of operation of the emergency braking device by a tractor and trailer may be identical to the passenger car. The trailer to be drawn by a vehicle on the roadway is provided with an emergency braking device mounted on the trailer body. The trailer body has a first end pivotally attached to the vehicle, and a second end supported by at least one wheel. An alternative method includes the providing of an emergency braking device having a vacuum shroud and a friction pad. This method further includes the step of sensing the occurrence of emergency braking situations, and the generating of an emergency braking deployment signal. Upon the occurrence of the deployment signal, there is a shifting of the vacuum shroud and friction pad between an inoperative position clear of the roadway to an operative position in which the friction pad engages the roadway, and the vacuum shroud cooperates with the roadway to define a substantially enclosed cavity. The method further includes the evacuating of the vacuum shroud to cause the friction pad to bear upon the roadway generating a friction load causing the trailer to decelerate at an increased rate. Preferably, the method further includes the retracting of the vacuum shroud and a friction pad upon the completion of an emergency braking maneuver.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

I claim:

1. An emergency braking device for a vehicle to be driven on a roadway, said vehicle having a sprung mass including a body, an unsprung mass including at least one rear wheel provided with a wheel brake mechanism, and a spring suspending the body upon the unsprung mass said emergency braking device comprising:

a vacuum shroud attached to the vehicle sprung mass adjacent the rear wheel, said vacuum shroud having a generally planar opening formed therein;

shift means to move the vacuum shroud between an inoperative position carried by the sprung mass clear of the roadway and an operative position in which the vacuum shroud is carried by the unsprung mass, and the vacuum shroud opening cooperates with the roadway moving relative thereto to define a substantially enclosed cavity;

pump means to evacuate the air from within the enclosed cavity to cause the vacuum shroud to be urged toward the roadway; and attachment means to couple the vacuum shroud in the operative position to the vehicle unsprung mass causing the normal force of the wheel to be increased without increasing the load on the spring, thereby enabling the wheel brake mechanism to decelerate the vehicle at an increased rate.

2. The invention of claim 1 further comprising sensor means to detect an emergency braking situation to provide an activation signal to deploy the shift means and pump means.

3. The invention of claim 1 wherein said vacuum shroud further comprises a flexible seal extending about the periphery of the vacuum shroud opening to enable the vacuum shroud to sealingly engage the roadway when spaced apart a limited distance therefrom.

4. The invention of claim 1 wherein said pump means further comprises a gas driven pump having an inlet connected to the enclosed cavity and a source of pressurized gas for driving the pump.

5. The invention of claim 4 wherein said source of pressurized gas further comprises a gas reservoir.

6. The invention of claim 5 wherein said source of pressurized gas further comprises a flammable fuel which generates gaseous combustion products.

7. An emergency braking device for a vehicle to be driven on a roadway, said vehicle having a sprung mass including a body suspended upon a plurality of front and rear springs cooperating with a pair of front wheels and a pair of rear wheels, each provided with a wheel brake mechanism, said rear wheels and associated brake mechanisms forming a rear unsprung mass, said emergency braking device comprising:

a vacuum shroud to be attached to the vehicle body adjacent the rear wheels, said vehicle shroud having a generally planar opening formed therein;

shift means to move the vacuum shroud between an inoperative position carried by the sprung mass spaced from the roadway, and an operating position in which the vacuum shroud opening cooperates with the roadway moving relative thereto to define a substantially enclosed cavity;

pump means to evacuate the air from within the enclosed cavity to cause the vacuum shroud to be urged toward the roadway; and attachment means to attach the vacuum shroud to the vehicle body when in the inoperative position and to attach the vacuum shroud to the unsprung mass in the operative position to thereby cause the normal force on the rear wheels during an emergency braking maneuver to be increased without increasing the rear spring load, thereby enabling the wheel brakes to decelerate the vehicle at an increased rate.

8. The invention of claim 7 wherein said shift means further comprises a gas powered cylinder.

9. The invention of claim 7 wherein said shift means further comprises a retract means to return the vacuum shroud to the inoperative position after the completion of an emergency braking maneuver.

10. The invention of claim 9 wherein said vacuum shroud further comprises a flexible seal extending about the periphery of the opening vacuum shroud to enable the vacuum shroud to sealingly engage the roadway when spaced apart a limited distance therefrom.

11. The invention of claim 7 wherein said vacuum shroud further comprises a flexible seal extending about the periphery of the opening vacuum shroud to enable the vacuum shroud to sealingly engage the roadway when spaced apart a limited distance therefrom.

12. The invention of claim 7 wherein said pump means further comprises a gas driven pump having an inlet connected to the enclosed cavity and a source of pressurized gas for driving the pump.

13. The invention of claim 12 wherein said source of pressurized gas further comprises a gas reservoir.

14. The invention of claim 12 wherein said shift means further comprises a retract means to return the vacuum shroud to the inoperative position after the completion of an emergency braking maneuver.

15. The invention of claim 7 further comprising sensor means for detecting an emergency braking situation to provide an activation signal to deploy the shift means and pump means.

16. A method of stopping a vehicle to be driven on a roadway, said vehicle having a sprung mass including a body, an unsprung mass including at least one rear wheel provided with a wheel brake mechanism, and a spring suspending the body upon the unsprung mass, said method comprising the following steps:

providing an emergency braking device to be attached to the vehicle adjacent the rear wheel comprising a vacuum shroud having a generally planar opening for cooperation with the roadway to define a substantially enclosed cavity;

sensing the occurrence of emergency braking situation and generating an emergency braking deployment signal;

shifting the vacuum shroud between an inoperative position carried by the sprung mass clear of the roadway, and an operative position carried by the unsprung mass in which the vacuum shroud cooperates with the roadway moving therebelow to define a substantially enclosed cavity; and evacuating the air from within the enclosed cavity to cause the vacuum shroud to be urged toward the roadway, increasing the normal force of the rear wheel without increasing the spring load, enabling the wheel brake mechanism to decelerate the vehicle at an increased rate.

17. The invention of claim 16 further comprising retracting the vacuum shroud to an inoperative position upon the conclusion of an emergency braking situation.

* * * * *

UNITED STATES PATENT AND TRADEMARK OFFICE
CERTIFICATE OF CORRECTION

PATENT NO. : 4,896,749

DATED : January 30, 1990

INVENTOR(S) : Frank H. Walker

It is certified that error appears in the above-identified patent and that said Letters Patent is hereby corrected as shown below:

Column 3, Line 34, the formula should appear as follows: $M_{32} = 0 = M - XWB$.

Column 3, Line 45, the formula should appear as follows: $M_{32} = 0 = M - HF_t - XWb$.

In the drawings, Fig. 1, the reference letter "Ff" located at the rear wheel should be --$F_r$--.

In the drawing, Fig. 8, the section line "13-13" should be --9-9--

Signed and Sealed this

Fifteenth Day of October, 1991

Attest:

HARRY F. MANBECK, JR.

Attesting Officer

Commissioner of Patents and Trademarks